United States Patent
Hamasaki

(10) Patent No.: US 11,995,429 B2
(45) Date of Patent: May 28, 2024

(54) SOFTWARE UPDATE DEVICE, UPDATE CONTROL METHOD, NON-TRANSITORY STORAGE MEDIUM, AND SERVER

(71) Applicant: TOYOTA JIDOSHA KABUSHIKI KAISHA, Toyota (JP)

(72) Inventor: Jun Hamasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/358,596

(22) Filed: Jun. 25, 2021

(65) Prior Publication Data

US 2022/0035620 A1 Feb. 3, 2022

(30) Foreign Application Priority Data

Jul. 28, 2020 (JP) ................. 2020-127515

(51) Int. Cl.
 *G06F 8/65* (2018.01)
 *H04L 67/06* (2022.01)
(52) U.S. Cl.
 CPC ............. *G06F 8/65* (2013.01); *H04L 67/06* (2013.01)
(58) Field of Classification Search
 CPC ............ H04L 67/06; H04L 29/08; G06F 8/65
 See application file for complete search history.

(56) References Cited

U.S. PATENT DOCUMENTS

| | | | | |
|---|---|---|---|---|
| 9,626,174 | B2* | 4/2017 | Chylinski | G06F 8/65 |
| 2007/0143303 | A1* | 6/2007 | Cho | G06F 8/65 |
| 2008/0065816 | A1* | 3/2008 | Seo | G06F 8/65 |
| | | | | 711/103 |
| 2014/0040611 | A1* | 2/2014 | Tenenboym | H04L 9/3297 |
| | | | | 713/157 |
| 2015/0067670 | A1* | 3/2015 | Benson | G06F 15/173 |
| | | | | 717/171 |
| 2017/0010880 | A1* | 1/2017 | Yamazaki | G06F 8/656 |
| 2017/0060559 | A1* | 3/2017 | Ye | G06F 8/65 |
| 2019/0057214 | A1* | 2/2019 | Xia | H04W 12/06 |
| 2020/0073651 | A1 | 3/2020 | Rodriguez Bravo et al. | |

FOREIGN PATENT DOCUMENTS

| | | |
|---|---|---|
| JP | 2004-326689 A | 11/2004 |
| JP | 2016-071879 A | 5/2016 |

\* cited by examiner

*Primary Examiner* — S. Sough
*Assistant Examiner* — Cheneca Smith
(74) *Attorney, Agent, or Firm* — Oliff PLC

(57) ABSTRACT

A software update device configured to control software update of an electronic control unit mounted on a vehicle, the software update device includes one or more processors configured: to download update data of software of the electronic control unit from a server; to transmit a validity confirmation request for confirming whether the update data is valid to the server before the update data is installed, to receive a confirmation result indicating whether the update data is valid from the server; to control the software update of the electronic control unit; and not to install the update data when the one or more processors determine that the update data is invalid based on the confirmation result received by the one or more processors.

6 Claims, 7 Drawing Sheets

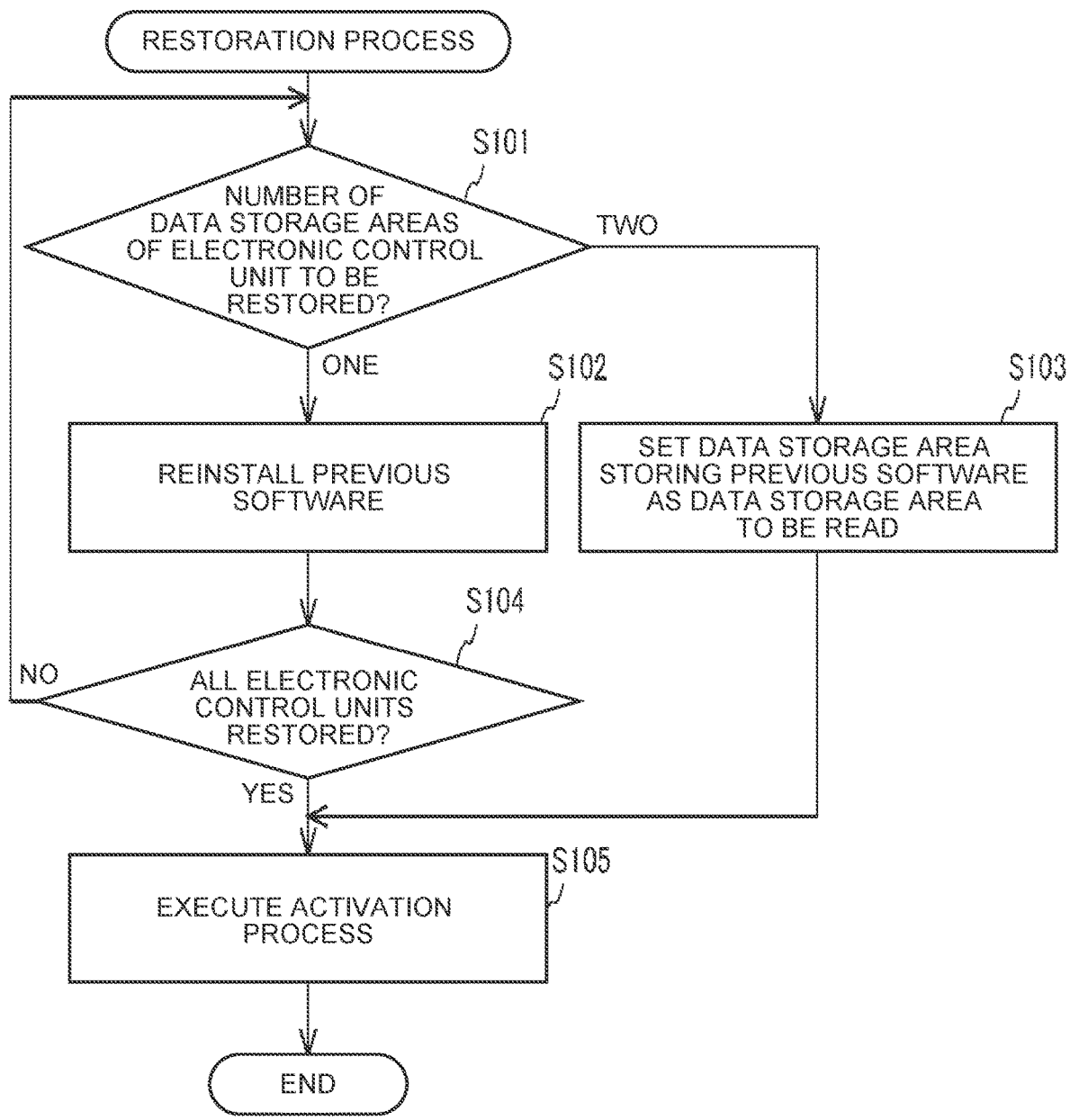

SOFTWARE UPDATE DEVICE, UPDATE CONTROL METHOD, NON-TRANSITORY STORAGE MEDIUM, AND SERVER

CROSS-REFERENCE TO RELATED APPLICATION

This application claims priority to Japanese Patent Application No. 2020-127515 filed on Jul. 28, 2020, incorporated herein by reference in its entirety.

BACKGROUND

1. Technical Field

The present disclosure relates to a software update device, an update control method, a non-transitory storage medium, and a server.

2. Description of Related Art

A vehicle is equipped with a plurality of electronic control units (ECUs) that controls an operation of a vehicle. The ECU includes a processor, a transitory storage unit such as a random access memory (RAM), and a non-volatile storage unit such as a flash read-only memory (ROM). The processor executes software stored in the non-volatile storage unit to realize the control function of the ECU. The software stored in each ECU is rewritable, and by updating the software to a newer version, it is possible to improve the function of each ECU or add a new vehicle control function.

As a technology for updating the software of the ECU, an over-the-air (OTA) technology is known, in which an in-vehicle communication device connected to an in-vehicle network is wirelessly connected to a communication network such as the Internet, the software is downloaded from the server via wireless communication, and the downloaded software is installed, thereby updating or adding program of the ECU (for example, refer to Japanese Unexamined Patent Application Publication No. 2004-326689 (JP 2004-326689 A)).

Software update by the OTA technology is performed when an event (campaign) for performing the software update is registered in the server and then the vehicle requests the server to confirm whether there is update data. When there is a software update campaign, the vehicle updates the software of the update-target electronic control unit by downloading the update data, installing the update data, and activating an updated version of the software in sequence.

SUMMARY

In the vehicle, it is assumed that all the processes of downloading, installation, and activation are not performed continuously. For example, it is assumed that the processes after installation are performed after a lapse of time from downloading the update data. On the other hand, in the server, the software update campaign may be canceled after the vehicle downloads the update data. When the campaign is canceled, the software of the update-target electronic control unit needs to be software that is valid and up-to-date at the time point before the canceled campaign is registered.

The present disclosure provides a software update device, an update control method, and a non-transitory storage medium, and a server that can maintain the software of the electronic control unit that was to be updated in a valid and up-to-date state when the software update campaign is canceled.

A software update device according to a first aspect of the present disclosure includes is configured to control software update of an electronic control unit mounted on a vehicle. The software update device includes one or more processors configured: to download update data of software of the electronic control unit from a server; to transmit a validity confirmation request for confirming whether the update data is valid to the server before the update data is installed, to receive a confirmation result indicating whether the update data is valid from the server; to control the software update of the electronic control unit; and not to install the update data when the one or more processors determine that the update data is invalid based on the confirmation result received by the one or more processors.

An update control method according to a second aspect of the present disclosure is executed by a computer including a processor, a memory, and a storage device for controlling software update of an electronic control unit mounted on a vehicle. The update control method includes: downloading update data of software of the electronic control unit from a server; transmitting a validity confirmation request for confirming whether the update data is valid to the server before the update data is installed; receiving a confirmation result indicating whether the update data is valid from the server; controlling the software update of the electronic control unit; and not installing the update data when the computer determines that the update data is invalid based on the confirmation result received by the computer from the server.

An update control program according to a third aspect of the present disclosure stores an update control program that is executable by a computer and that causes the computer to perform the update control method according to the second aspect so as to control software update of an electronic control unit mounted on a vehicle. The computer including a processor, a memory, and the non-transitory storage medium.

A server according to a fourth aspect of the present disclosure is configured to manage software update of an electronic control unit mounted on a vehicle. The server includes one or more processors configured to: transmit update data of software of the electronic control unit to the vehicle; and transmit a confirmation result indicating whether the update data is valid to the vehicle when the one or more processors receive a validity confirmation request for confirming whether the update data is valid from the vehicle, the confirmation result indicating that the update data is invalid when the software update using the update data is canceled.

The present disclosure can provide the software update device, the update control method, the non-transitory storage medium, and the server that can maintain the software of the electronic control unit that was to be updated in a valid and up-to-date state when the software update campaign is canceled.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9 is a flowchart showing the details of the restoration process shown in FIG. 8.

DETAILED DESCRIPTION OF EMBODIMENTS

First Embodiment

Figure 1:
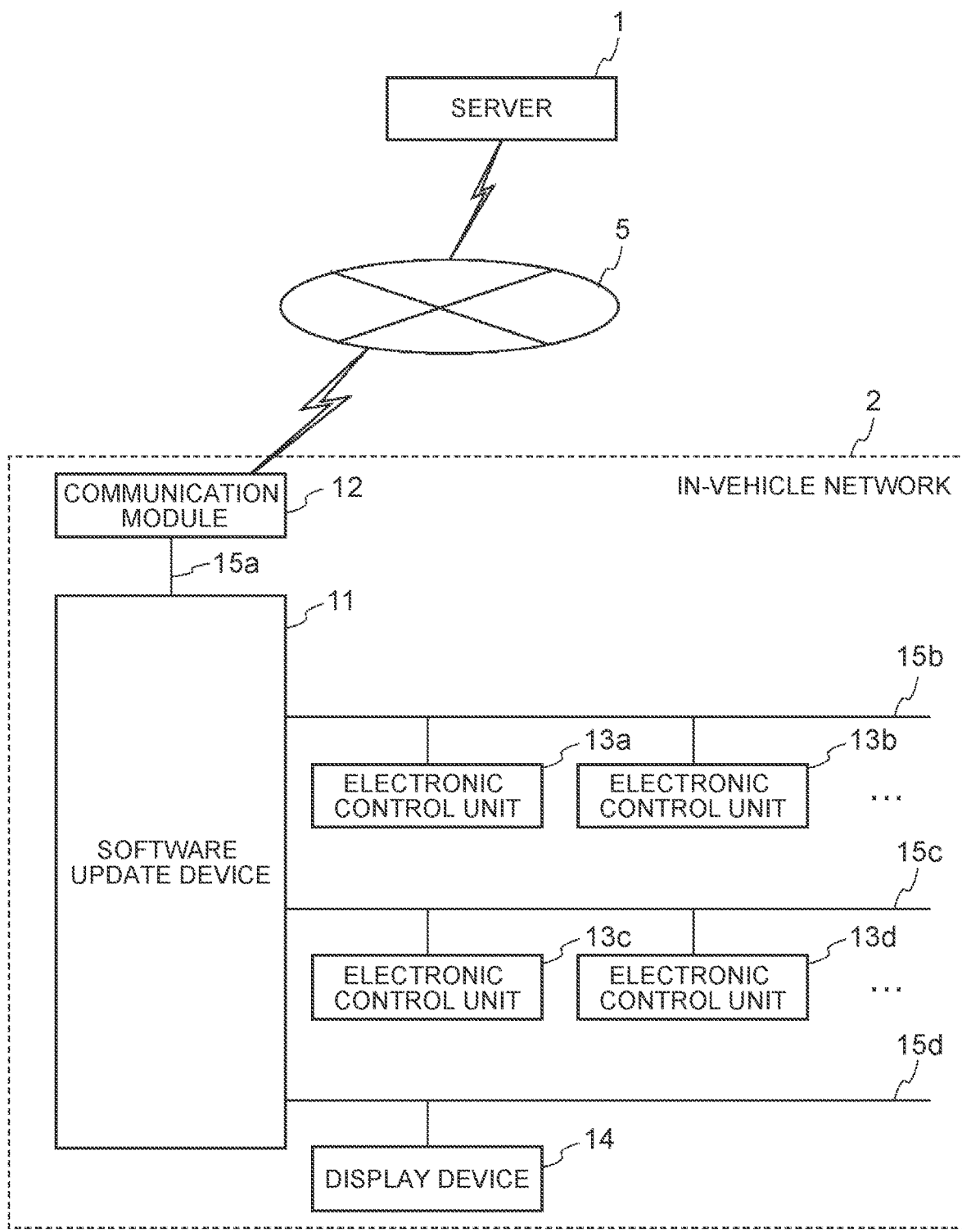
FIG. 1 is a block diagram showing an overall configuration of a network system according to an embodiment.
Figure 2:
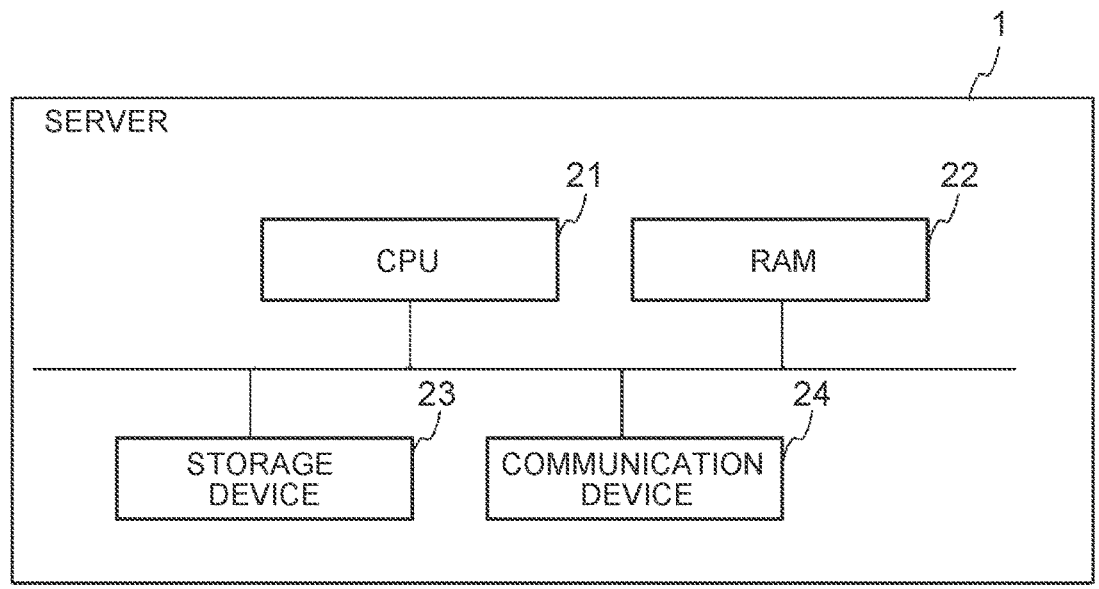
FIG. 2 is a block diagram showing a schematic configuration of a server shown in FIG. 1.
Figure 3:
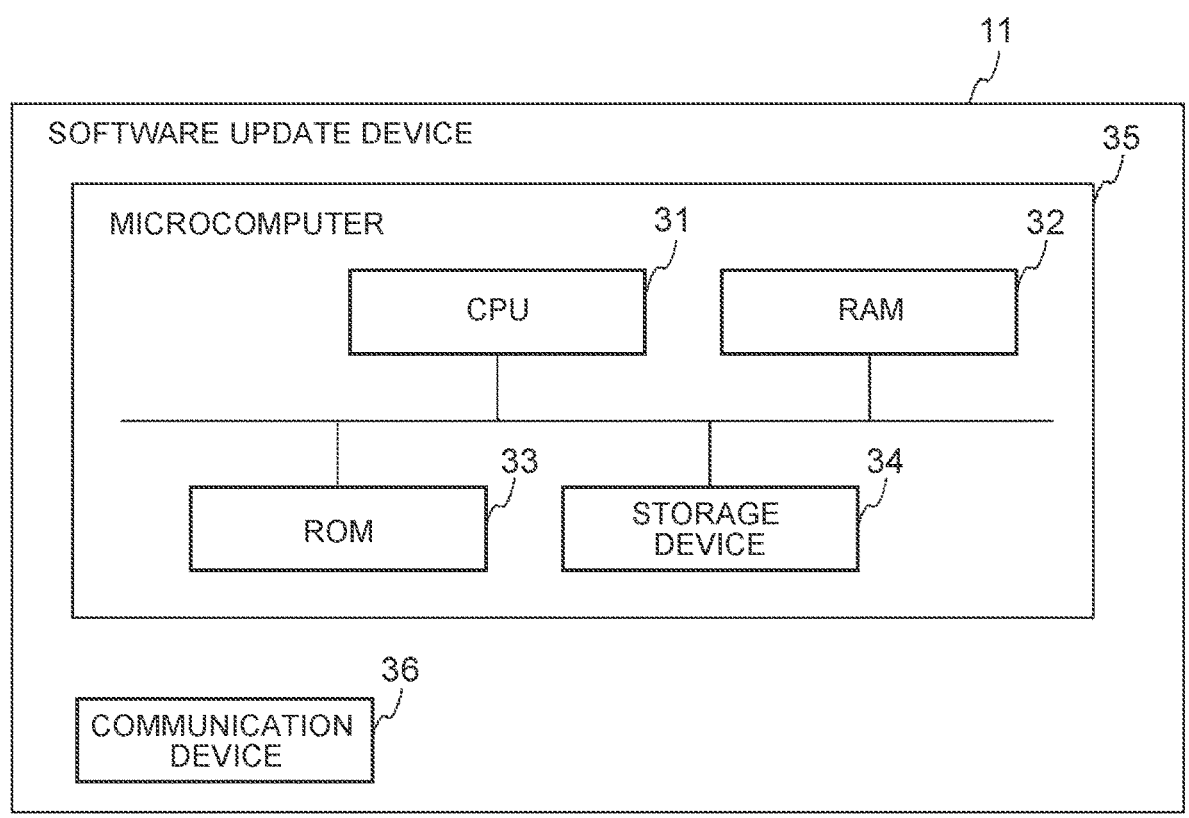
FIG. 3 is a block diagram showing a schematic configuration of a software update device shown in FIG. 1.

FIG. 1 is a block diagram showing an overall configuration of a network system according to an embodiment. FIG. 2 is a block diagram showing a schematic configuration of a server shown in FIG. 1. FIG. 3 is a block diagram showing a schematic configuration of a software update device shown in FIG. 1.

The network system shown in FIG. 1 is a system for updating software of electronic control units 13a, 13b, 13c and 13d mounted on a vehicle, and includes a server 1 (center) and an in-vehicle network 2 mounted on the vehicle.

The server 1 is communicable with a software update device 11 mounted on the vehicle via a network 5, and manages software updates of the electronic control units 13a to 13d mounted on the vehicle.

As shown in FIG. 2, the server 1 includes a central processing unit (CPU) 21, a random access memory (RAM) 22, a storage device 23, and a communication device 24. The number of the CPU 21, the RAM 22, and the storage device 23 included in the server 1 may be plural. The storage device 23 includes a readable and writable storage medium such as a hard disk or a solid state drive (SSD), and stores a program for executing software update management, information used for update management, and update data of the electronic control unit. In the server 1, the CPU 21 executes a control process to be described later by executing the program read from the storage device 23 using the RAM 22 as a work area. The communication device 24 is a device that communicates with the software update device 11 via a network.

The in-vehicle network 2 includes the software update device 11 (over-the-air (OTA) master), a communication module 12, the electronic control units 13a to 13d, and a display device 14. The software update device 11 is connected to the communication module 12 via a bus 15a, is connected to the electronic control units 13a, 13b via a bus 15b, is connected to the electronic control units 13c, 13d via a bus 15c, and is connected to the display device 14 via a bus 15d. The software update device 11 is communicable with the server 1 wirelessly via the communication module 12. The software update device 11 controls the software update of the update-target electronic control unit, among the electronic control units 13a to 13d, based on the update data acquired from the server 1. The software update device 11 may also be referred to as a central gateway. The communication module 12 is a communication device that connects the in-vehicle network 2 and the server 1. The electronic control units 13a to 13d control an operation of each component of the vehicle. The display device 14 (human machine interface (HMI)) is used to display various indications such as an indication that there is update data, an indication of an approval request screen for obtaining an approval on the software update from a user or an administrator, an indication of update results, and the like, when an update process of the software of the electronic control units 13a to 13d is performed. As the display device 14, a display device of a car navigation system can be typically used. However, the display device 14 is not particularly limited as long as the display device 14 can display information necessary for an update process of a program. Although four electronic control units 13a to 13d are illustrated in FIG. 1, the number of electronic control units is not particularly limited. In addition, another electronic control unit may be further connected to the bus 15d shown in FIG. 1, besides the display device 14.

The electronic control units 13a to 13d each include a CPU, a RAM, a non-volatile memory, and a communication device. The CPU realizes functions of each electronic control unit by executing software (program) read from the non-volatile memory using the RAM as a work area. Here, the electronic control unit includes one having one data storage area (bank) for storing software and one having two data storage areas (banks) for storing software. In the data storage area of the electronic control unit, version information, parameter data, a boot program for booting, a program for software update, etc. may be stored, in addition to software for realizing the functions of the electronic control unit. In the electronic control unit having one data storage area, the software of the electronic control unit is affected as the update data is installed in the data storage area. On the other hand, in the electronic control unit having two data storage areas, one of the two data storage areas is set as a storage area (operational side) to be read, and the software stored in the storage area to be read is executed. The update data can be written in the background to the other storage area (non-operational side) that is not the storage area to be read during execution of the program in the storage area (operational side) to be read. When the activation is performed in the software update process, the updated version of the software can be activated as the storage area from which the CPU 41 reads the program is switched.

In the present disclosure, the electronic control unit having two data storage areas includes an electronic control unit that is provided with a memory called "one-side suspend memory" in which the one-side data storage area of the non-volatile memory is divided into two sides in a pseudo manner and a program can be written on one of the two sides of the data storage area while the program stored in the other side is being executed, and an electronic control unit that is provided with an extended non-volatile memory having a one-side data storage area in addition to a non-volatile memory having one-side data storage area and in which these two non-volatile memories can be used as the operational side and the non-operational side.

As shown in FIG. 3, the software update device 11 includes a microcomputer 35 and a communication device 36. The microcomputer 35 includes a CPU 31, a RAM 32, a ROM 33, and a storage device 34. The number of the CPU 31, the RAM 32, ROM 33, and the storage device 34 included in the microcomputer 35 may be plural. In the software update device 11, the CPU 31 of the microcomputer 35 executes a control process described later by executing the program read from the ROM 33 using the RAM 32 as a work area. The communication device 36 is a device that communicates with the communication module 12, the electronic control units 13a to 13d, and the display device 14 via the buses 15a to 15d shown in FIG. 1.

Here, the software update process involves a phase of downloading the update data from the server 1, a phase of transferring the downloaded update data to the update-target electronic control unit and installing the update data in the storage area of the update-target electronic control unit, and a phase of activation in which the updated version of the software installed in the update-target electronic control unit is activated.

Downloading is a process of receiving and storing the update data transmitted from the server 1 for updating the software of the electronic control unit. The downloading phase includes, besides receiving the update data, control of a series of processes related to downloading, such as determination as to whether downloading can be performed and verification of the update data. Installation is a process of writing an updated version of the program (update software) in the update-target electronic control unit based on the downloaded update data. The installation phase includes, in addition to execution of installation, control of a series of processes related to installation, such as determination as to whether installation can be performed, transfer of the update data, and verification of the updated version of the program. Activation is a process of activating the installed updated version of the program. The activation control includes, in addition to execution of activation, control of a series of processes related to activation, such as determination as to whether the activation can be performed and verification of the execution results.

The update data transmitted from the server 1 to the software update device 11 may include any of the update software of the electronic control unit, the compressed data obtained by compressing the update software, and the divided data obtained by dividing the update software or the compressed data. Further, the update data may include an identifier for identifying the update-target electronic control unit (ECU ID) and an identifier for identifying the software before update (ECU software ID). The update data is downloaded as the distribution package described above, and the distribution package contains the update data of one or more electronic control units.

When the update data includes the update software itself, the software update device 11 transfers the update data (update software) to the update-target electronic control unit during the installation phase. When the update data includes compressed data, difference data, or divided data of the update software, the software update device 11 may transfer the update data to the update-target electronic control unit and the update-target electronic control unit may generate the update software from the update data. Alternatively, the software update device 11 may transfer the update software to the update-target electronic control unit after generating the update software from the update data. Here, the update software can be generated by decompressing the compressed data and assembling the difference data or the divided data.

The update software can be installed by the update-target electronic control unit based on the installation request from the software update device 11. Alternatively, the update-target electronic control unit that has received the update data may autonomously perform installation without receiving an explicit instruction from the software update device 11.

The update software can be activated by the update-target electronic control unit based on the activation request from the software update device 11. Alternatively, the update-target electronic control unit that has received the update data may autonomously perform activation without receiving an explicit instruction from the software update device 11.

The software update process can be performed continuously or in parallel for each of the electronic control units.

Further, the "program update process" in the present specification includes not only a process of continuously performing all of the downloading, installation, and activation, but also a process of performing only a part of the downloading, installation, and activation.

Figure 4:
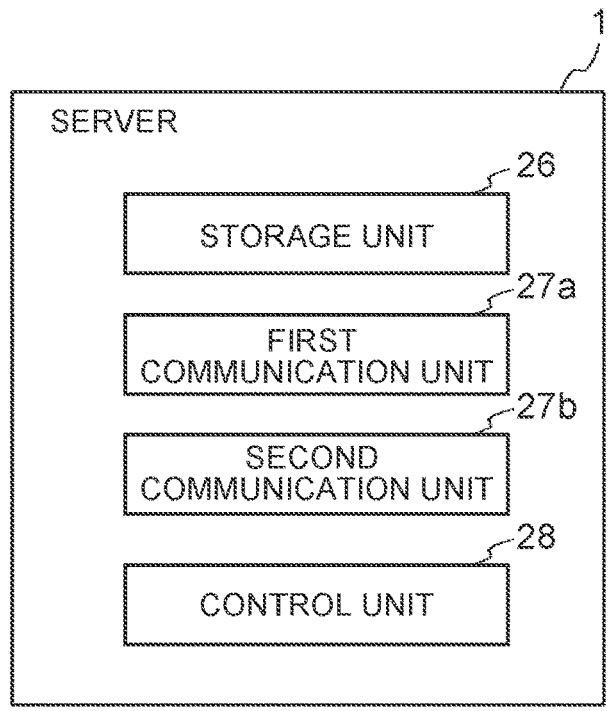
FIG. 4 is a functional block diagram of the server shown in FIG. 1.

FIG. 4 is a functional block diagram of the server shown in FIG. 1.

The server 1 includes a storage unit 26, a first communication unit 27a, a second communication unit 27b, and a control unit 28. The first communication unit 27a, the second communication unit 27b, and the control unit 28 are realized by the CPU 21 shown in FIG. 2 executing a program stored in the storage device 23 using the RAM 22, and the storage unit 26 is realized by the storage device 23 shown in FIG. 2.

The storage unit 26 stores update management information associated with information indicating software that is available for one or more electronic control units mounted on the vehicle for each vehicle identification information (vehicle ID) that identifies the vehicle, and the update data of the software of the electronic control unit. A combination of the latest version information of the software of each of the electronic control units is defined as, for example, the information indicating the available software for the electronic control unit. The update management information and the update data are stored in the storage unit 26 when the software update campaign of the electronic control unit is registered.

The first communication unit 27a can receive a software update confirmation request from the software update device 11. The update confirmation request is, for example, information transmitted from the software update device 11 to the server 1 when power supply or ignition is turned on in the vehicle, and is information for requesting the server 1 to confirm whether there is update data of the electronic control unit. The first communication unit 27a transmits the information indicating whether there is update data to the software update device 11 in response to the update confirmation request received from the software update device 11. Further, the first communication unit 27a can receive a transmission request (download request) of a distribution package from the software update device 11. When the first communication unit 27a receives the download request for the distribution package, the first communication unit 27a transmits the distribution package including the software update data of the electronic control unit to the software update device 11.

The second communication unit 27b can receive a validity confirmation request of the update data from the software update device 11. The validity confirmation request is, for example, information that is transmitted from the software update device 11 to the server 1 after the update data is downloaded and before the downloaded update data is installed, and also information that is used for requesting the server 1 to confirm whether the update data to be installed is valid. When the second communication unit 27b receives the validity confirmation request of the update data, the second communication unit 27b transmits a confirmation result indicating whether the designated update data is valid to the software update device 11.

When the first communication unit 27a receives the update confirmation request, the control unit 28 determines whether there is update data of the software of the vehicle specified by the vehicle ID included in the update confirmation request, based on the update management information stored in the storage unit 26. The first communication unit 27a transmits the determination result by the control unit 28 indicating whether there is update data to the software update device 11. When the control unit 28 determines that there is update data of the electronic control unit and receives the download request for the distribution package from the software update device 11, the control unit 28 generates the distribution package including the update data stored in the storage unit 26. The distribution package is transmitted to the software update device 11 by the first communication unit 27a.

Further, when the second communication unit 27b receives the validity confirmation request of the update data, the control unit 28 determines whether the software update event (campaign) using the designated update data is canceled. When the campaign related to the designated update data is canceled, the control unit 28 creates a confirmation result indicating that the designated update data is invalid. In other cases than above, the control unit 28 creates the confirmation result indicating that the designated update data is valid. The second communication unit 27b transmits the confirmation result created by the control unit 28 to the software update device 11.

Figure 5:
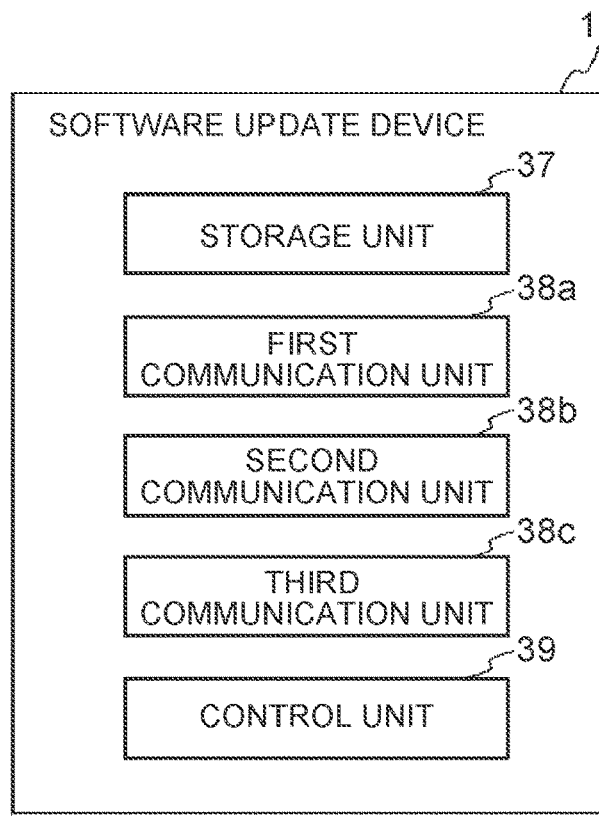
FIG. 5 is a functional block diagram of the software update device shown in FIG. 1.

FIG. 5 is a functional block diagram of the software update device shown in FIG. 1.

The software update device 11 includes a storage unit 37, a first communication unit 38a, a second communication unit 38b, a third communication unit 38c, and a control unit 39. The storage unit 37 is realized by the storage device 34 shown in FIG. 3. The first communication unit 38a, the second communication unit 38b, the third communication unit 38c, and the control unit 39 are realized in a manner such that the CPU 31 shown in FIG. 3 executes a program stored in the ROM 33 using the RAM 32.

The storage unit 37 stores the program for executing the software update of the electronic control units 13a to 13d, various data to be used when the software update is executed, and the update data of the software downloaded from the server 1. Further, the storage unit 37 functions as a backup area for the software stored in the data storage area of the electronic control unit before the update data is installed. More specifically, when the update-target electronic control unit has only one data storage area (bank), the storage unit 37 stores the data of previous software stored in the storage area before the update data is installed. The data of the previous software may be the data of the entire previous version of the software, or may be the differential data for restoring the previous version of the software from the new version of the software to which the update data is applied. The storage unit 37 may store the data (backup data) of the previous software as compressed data.

The first communication unit 38a transmits, for example, an update confirmation request of the software to the server 1 when the power supply or the ignition of the vehicle is turned on. The update confirmation request includes the vehicle ID for identifying the vehicle and software versions of the electronic control units 13a to 13d connected to the in-vehicle network 2. The vehicle ID and the software version of the electronic control units 13a to 13d are used for determining whether there is the update data of the software of the corresponding electronic control unit based on a comparison with the latest version of the software retained by the server 1 for each vehicle ID. In addition, the first communication unit 38a receives a notification indicating whether there is the update data from the server 1 in response to the update confirmation request. When there is update data of the software of the electronic control unit, the first communication unit 38a transmits a download request for the distribution package to the server 1 and receives the distribution package transmitted from the server 1. In addition to the update data, the distribution package may include verification data for verifying the authenticity of the update data, the number and installation order of update data, various types of control information used at the time of software update, and the like.

The second communication unit 38b transmits the validity confirmation request for confirming whether the update data is valid to the server 1 before the update data received from the server 1 is installed. The validity confirmation request includes vehicle identification information (vehicle ID) for identifying the vehicle and identification information for identifying the downloaded distribution package or the update data. The second communication unit 38b receives the confirmation result transmitted from the server 1 in response to the validity confirmation request.

The third communication unit 38c transmits the validity confirmation request to confirm whether the installed update data is valid to the server 1 after the update data received from the server 1 is installed and before the installed update data is activated. The validity confirmation request includes vehicle identification information (vehicle ID) for identifying the vehicle and identification information for identifying the downloaded distribution package or the update data. The third communication unit 38c receives the confirmation result transmitted from the server 1 in response to the validity confirmation request.

The control unit 39 performs various processes for controlling the software update of the electronic control unit. The control unit 39 determines whether there is update data of software of the electronic control unit based on the confirmation result, which is the response to the update confirmation request, received by the first communication unit 38a from the server 1. Further, when the first communication unit 38a receives the distribution package including the update data from the server 1, the control unit 39 verifies the authenticity of the received distribution package.

Further, the control unit 39 determines whether the update data is valid before the update data is installed. As described above, the second communication unit 38b receives the confirmation result indicating whether the update data designated in the validity confirmation request is valid as the response to the validity confirmation request that the second communication unit 38b transmits to the server 1. The control unit 39 can determine whether the update data is valid (that is, the campaign related to the update data is not canceled) or the update data is invalid (that is, the campaign related to the update data is canceled), based on the confirmation result received by the second communication unit 38b. When the control unit 39 determines that the update data is valid based on the confirmation result received by the second communication unit 38b, the control unit 39 starts the installation process of the update data. However, when the control unit 39 determines that the update data is invalid, the control unit 39 does not install the update data. The validity of the update data is inquired to the server 1 and confirmed before the update data is installed, and thereby, installation of the update data can be restrained when the campaign related to the update data is canceled.

Further, the control unit 39 determines whether the update data is valid after the update data is installed and before the installed update data is activated. As described above, the third communication unit 38c receives the confirmation result indicating whether the update data designated in the validity confirmation request is valid as the response to the validity confirmation request that the third communication unit 38c transmits to the server 1. The control unit 39 can determine whether the update data is valid (that is, the campaign related to the update data is not canceled) or the update data is invalid (that is, the campaign related to the update data is canceled), based on the confirmation result received by the third communication unit 38c. When the control unit 39 determines that the update data is valid based on the confirmation result received by the third communication unit 38c, the control unit 39 starts the activation process of the updated version of the software. However, when the control unit 39 determines that the update data is invalid, the control unit 39 restores the software of the update-target electronic control unit to the state before the update data is installed. The restoration process performed by the control unit 39 differs depending on the number of the data storage area of the update-target electronic control unit. Although the details will be described later, when the update-target electronic control unit has one data storage area, the control unit 39 returns the updated software stored in the data storage area to the previous software before the update by means of rollback. On the other hand, when the update-target electronic control unit has two data storage areas, the control unit 39 does not activate the updated version of the software, and the data storage area in which the previous software is stored is maintained as the data storage area to be read.

As an approval request process, the control unit 39 performs a process of causing an output device to output a notification indicating that an approval on the software update is required and a notification encouraging an input indicating that the software update is approved, and a process of receiving an operation input from the user. As the output device, the display device 14 provided in the in-vehicle network 2 or a voice output device that performs a voice notification, for example, may be used. For example, when the display device 14 is used as an output device in the approval request process, the control unit 39 causes the display device 14 to display the approval request screen for requesting an approval on the software update, and causes the display device 14 to display a notification encouraging the user or the administrator to perform a predetermined input operation, such as pressing an approval button, when the user or the administrator approves the software update. Further, in the approval request process, the control unit 39 causes the display device 14 to display a text or an icon notifying that there is update data of the software of the electronic control unit or causes the display device 14 to display restrictions during execution of the software update process, for example.

Figure 6:
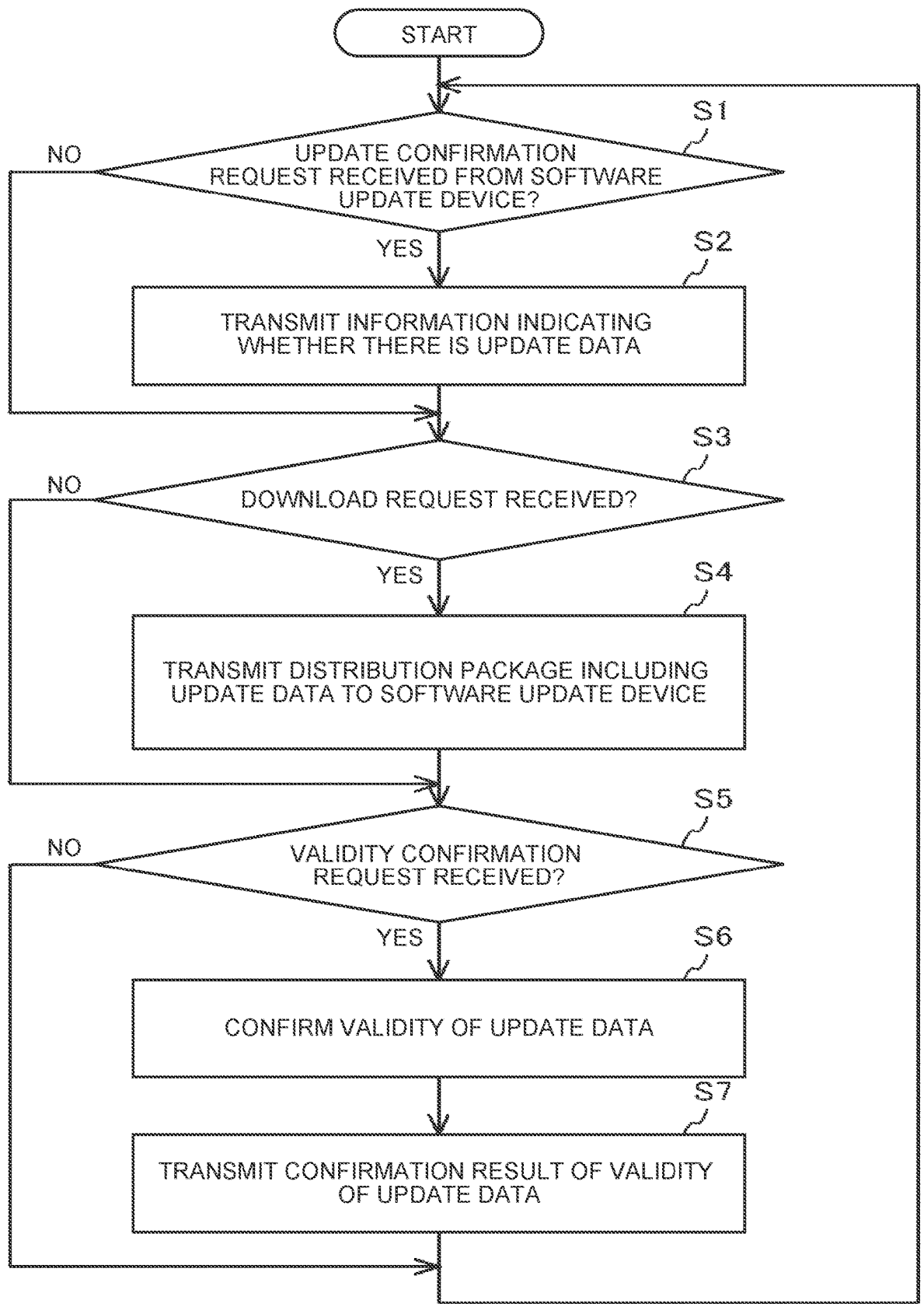
FIG. 6 is a flowchart showing an example of a control process executed by the server according to the embodiment.

FIG. 6 is a flowchart showing an example of the control processes executed by the server according to the embodiment. The control processes S1 to S7 shown in FIG. 6 are repeatedly executed, for example, at predetermined time intervals.

In step S1, the first communication unit 27a determines whether the update confirmation request has been received from the software update device 11. When the determination in step S1 is YES, the process proceeds to step S2; otherwise, the process proceeds to step S3.

In step S2, the first communication unit 27a transmits information indicating whether there is update data of the software of the electronic control unit to the vehicle that has transmitted the update confirmation request. Regarding whether there is update data, a determination that there is update data can be made, for example, when the control unit 28 compares the combination of software versions associated with the vehicle ID in the update confirmation request and stored in the update management information, with the combination of the current software versions included in the update confirmation request, and the combination of the current software versions included in the update confirmation request is older than the combination of the versions stored in the update management information. After that, the process proceeds to step S3.

In step S3, the first communication unit 27a determines whether the download request for the distribution package has been received from the software update device 11. When the determination in step S3 is YES, the process proceeds to step S4; otherwise, the process proceeds to step S5.

In step S4, the first communication unit 27a transmits, to the software update device 11, the distribution package that includes the update data of software and is generated by the control unit 28. After that, the process proceeds to step S5.

In step S5, the second communication unit 27b determines whether a validity confirmation request of the update data has been received from the software update device 11. When the determination in step S5 is YES, the process proceeds to step S6; otherwise, the process proceeds to step S1.

In step S6, the control unit 28 determines the validity of the update data designated by the software update device 11. For example, the control unit 28 determines, based on the identification information of the update data included in the validity confirmation request received by the second communication unit 27b in step S5, whether the campaign of the update data designated by the identification information is canceled. When the control unit 28 determines that the campaign is canceled, the control unit 28 determines that the designated update data is invalid. In other cases, the control unit 28 determines that the designated update data is valid. After that, the process proceeds to step S7.

In step S7, the second communication unit 27b transmits, to the software update device 11, the determination result obtained in step S6, that is, the confirmation result indicating whether the designated update data is valid. After that, the process proceeds to step S1.

Figure 7:
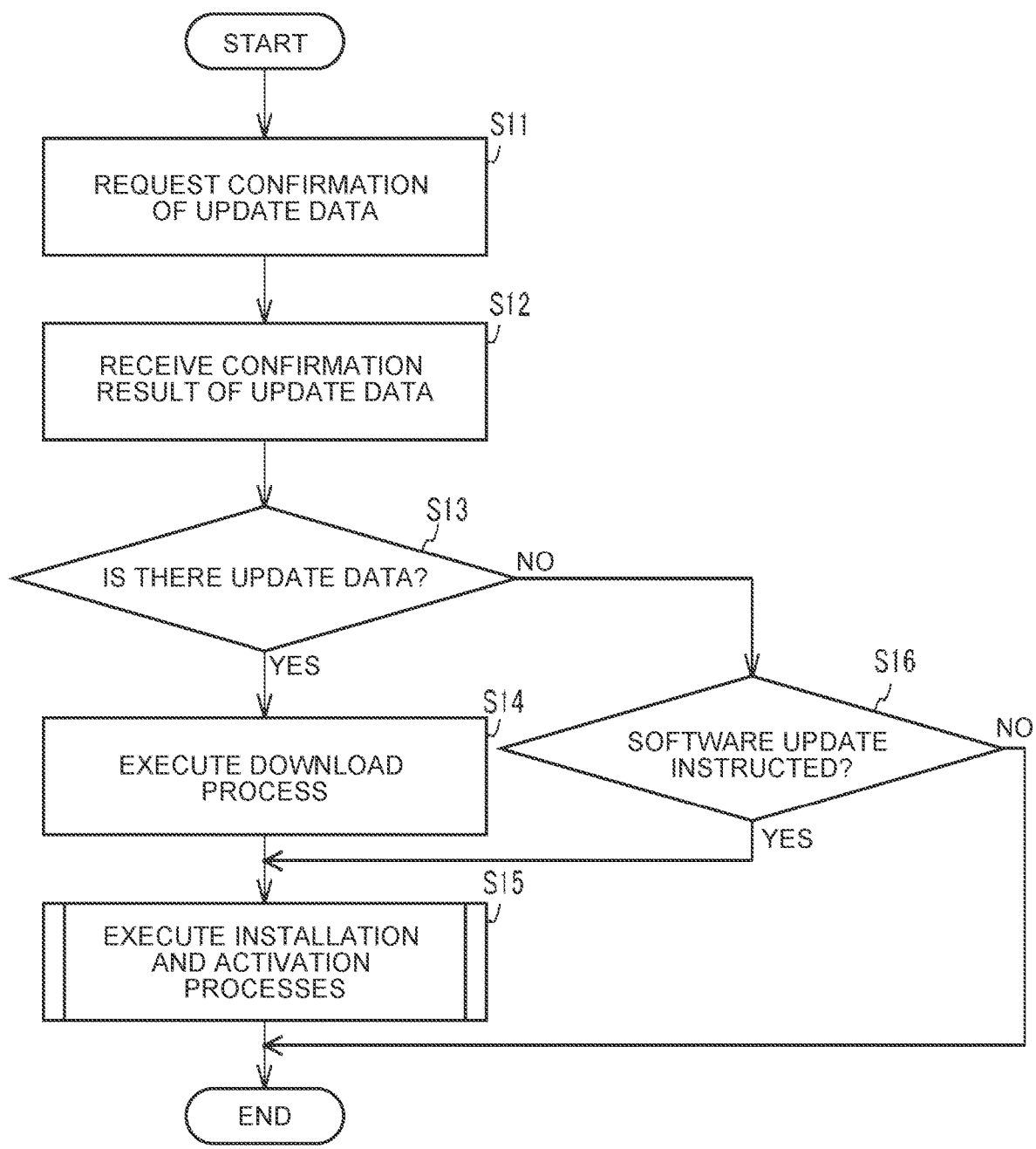
FIG. 7 is a flowchart showing an example of the control process executed by the software update device according to the embodiment.

FIG. 7 is a flowchart showing an example of the control process executed by the software update device according to the embodiment. The control process shown in FIG. 7 is executed, for example, when power supply or ignition of the vehicle is turned on.

In step S11, the first communication unit 38a transmits the update confirmation request including the vehicle ID and the combination of the software versions of the electronic control unit to the server 1. After that, the process proceeds to step S12.

In step S12, the first communication unit 38a receives the confirmation result that is the response to the update confirmation request from the server 1. After that, the process proceeds to step S13.

In step S13, the control unit 39 determines whether there is update data of software of any of the electronic control units 13a to 13d based on the confirmation result received in step S12. When the determination in step S13 is YES, the process proceeds to step S14; otherwise, the process proceeds to step S16.

In step S14, the first communication unit 38a executes the download process. More specifically, the first communication unit 38a transmits a download request for the distribution package to the server 1, receives the distribution package transmitted in response to the download request, and stores the received distribution package in the storage unit 37. The control unit 39 verifies the authenticity of the update data included in the received distribution package. In step S14, the control unit 39 may determine whether the download can be performed, and may notify the server 1 of completion of downloading. After that, the process proceeds to step S15.

In step S15, the control unit 39 executes the installation process and the activation process for the update-target electronic control unit, and ends the process.

In step S16, the control unit 39 determines whether the instruction to execute the software update process has been received. The software update process is not always executed continuously. For example, there may be a case where the software update process is suspended at the time point when the download is completed or the installation is completed, and the subsequent update process is executed later. Therefore, in the present embodiment, when the control unit 39 determines in step S13 that there is no update data, the software update process that has been suspended can be resumed by providing a determination in step S16. The determination in step S16 can be made based on, for example, whether a predetermined operation input is received using the input button, etc., after the text or the icon notifying that the software update process has been suspended is displayed on the display device 14. When the determination in step S16 is YES, the process proceeds to step S15; otherwise, the process ends.

Figure 8:
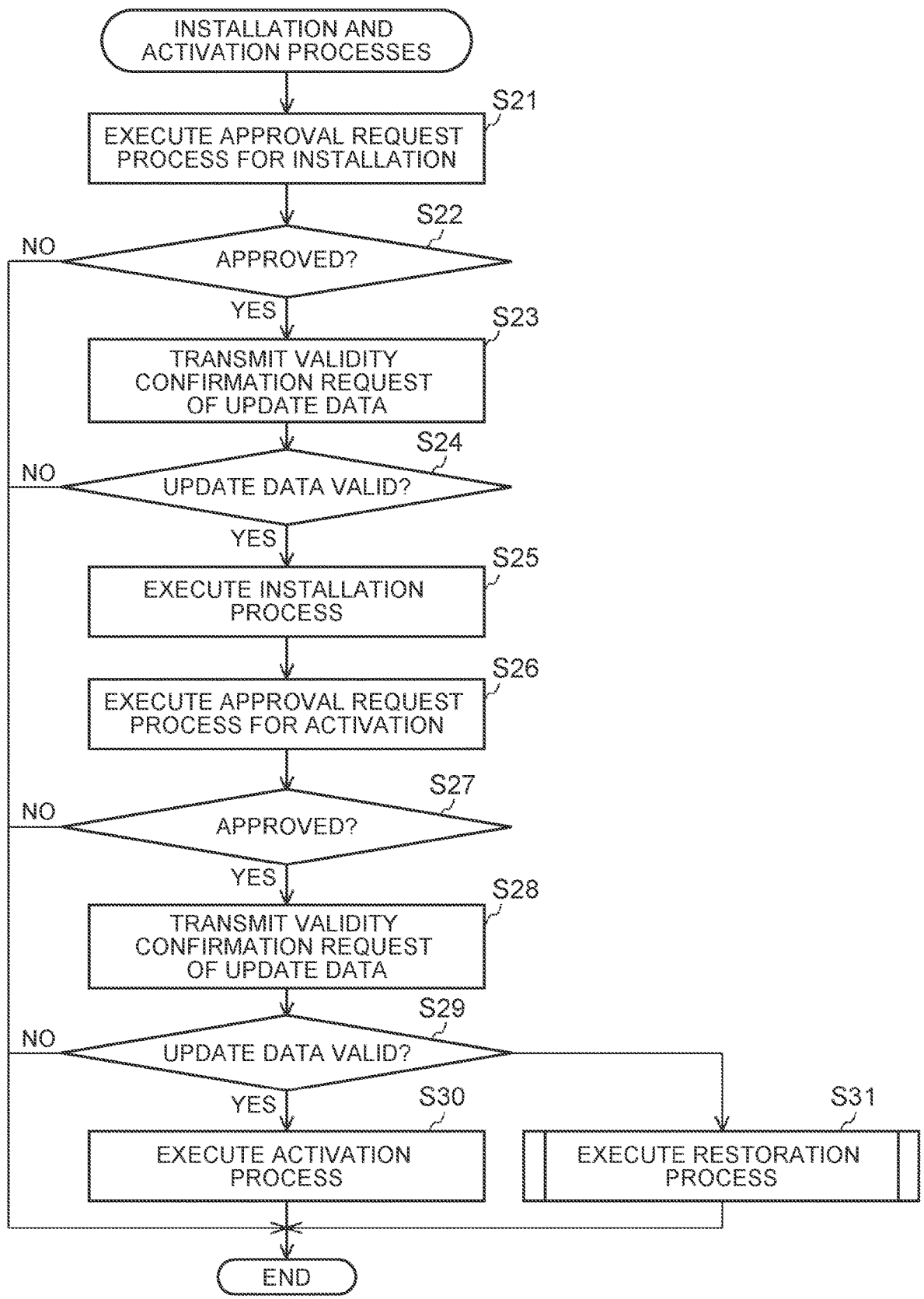
FIG. 8 is a flowchart showing details of installation and activation processes shown in FIG. 7.

FIG. 8 is a flowchart showing details of the installation and activation processes shown in FIG. 7.

In step S21, the control unit 39 executes an approval request process for installation. For example, the control unit 39 causes the display device 14 to display an indication to start the software update of the electronic control unit, an indication to request the approval of the user for the software update, and if necessary, an indication of the time required to install the update data and restrictions and precautions during installation, and receives an operation input by the user using an input device such as a touch panel and an operation button. After that, the process proceeds to step S22.

In step S22, the control unit 39 determines whether the operation input of approving the software update (installation) has been performed. The operation input of approving the installation can be determined based on, for example, whether a button "approve", "start update", etc. displayed on the display device 14 is pressed. When the user does not immediately approve the start of software update (installation) and desires to start the software update (installation) later, such an intention can be received when a button "later" etc. is pressed. In this case, the control unit 39 determines NO in step S22. When the determination in step S22 is YES, the process proceeds to step S23; otherwise, the process ends.

In step S23, the second communication unit 38b transmits the validity confirmation request for confirming whether the update data to be installed is valid to the server 1. The validity confirmation request includes information that identifies the distribution package or the update data contained in the distribution package. After that, the process proceeds to step S24.

In step S24, the control unit 39 determines whether the update data to be installed is valid based on the confirmation result that is the response to the validity confirmation and is received by the second communication unit 38b from the server 1. When the determination in step S24 is YES, the process proceeds to step S25; otherwise, the process ends.

In step S25, the control unit 39 transfers the update data to the update-target electronic control unit and instructs the installation. After that, the process proceeds to step S26. The update-target electronic control unit writes the update data received from the software update device 11 to the data storage area.

In step S26, the control unit 39 executes the approval request process for activation. The control unit 39 causes the display device 14 to display, for example, an indication that the software update of the electronic control unit is ready and the program is updated by a specific operation such as turning off of power supply or ignition, and if necessary, an indication of the time required for activation and restrictions and precautions during activation, and receives an operation input by the user using the input device such as a touch panel and an operation button. After that, the process proceeds to step S27.

In step S27, the control unit 39 determines whether the operation input of approving the software update (activation) has been performed. The operation input of approving the activation can be determined based on, for example, whether a button "approve", "update", etc. displayed on the display device 14 is pressed. Further, when the user does not immediately approve the software update (activation) and desires to perform the software update later, such an intention can be received when a button "later" etc. is pressed. In this case, the control unit 39 determines NO in step S27. When the determination in step S27 is YES, the process proceeds to step S28; otherwise, the process ends.

In step S28, the third communication unit 38c transmits the validity confirmation request for confirming whether the installed update data is valid to the server 1. The validity confirmation request includes information that identifies the distribution package or the update data contained in the distribution package. The process proceeds to step S29.

In step S29, the control unit 39 determines whether the installed update data is valid based on the confirmation result that is the response to the validity confirmation and is received by the third communication unit 38c from the server 1. When the determination in step S29 is YES, the process proceeds to step S30; otherwise, the process proceeds to step S31.

In step S30, the control unit 39 instructs the update-target electronic control unit to activate the updated version of the software. After that, the process ends. The update-target electronic control unit is restarted when a specific operation such as turning off of power supply or ignition is performed, and executes the updated software. Thus, the software update (function update) of the electronic control unit is completed.

In step S31, the control unit 39 executes the restoration process and ends the process. In the present disclosure, "restoration" means that the electronic control unit is turned into a state where the software of the version that has been executed before the update data is installed (previous software) is executable.

When the update-target electronic control unit has a configuration having one data storage area, the software of the electronic control unit is affected upon installation of the update data in the data storage area. Therefore, the installation process and the activation process are preferably performed continuously. Therefore, when the update-target electronic control unit has a configuration having one data storage area, the processes related to the approval before the activation is executed (steps S26 and S27) may be omitted.

FIG. 9 is a flowchart showing the details of the restoration process shown in FIG. 8.

In step S101, the control unit 39 determines whether the number of data storage areas included in the update-target electronic control unit is one or two. The number of data storage areas included in the electronic control unit may be stored in the storage unit 37 in advance in accordance with the configuration of the electronic control unit at the time of manufacturing the vehicle, etc., may be acquired from the update-target electronic control unit via communication, or may be acquired from the server 1. When the software update device 11 acquires, from the server 1, the number of data storage areas of the update-target electronic control unit, the server 1 may transmit, to the software update device 11, the distribution package including the update data with information related to the number of data storage areas of the update-target electronic control unit included therein, and the control unit 39 may determine the number based on the information included in the distribution package. When the number of data storage areas of the update-target electronic control unit is one, the process proceeds to step S102. When the number of data storage areas of the update-target electronic control unit is two, the process proceeds to step S103.

In step S102, the control unit 39 instructs the electronic control unit to be restored to reinstall the previous software before the update data is applied. When the data of the previous software is backed up in the storage unit 37 of the software update device 11 before the update data is installed in the update-target electronic control unit (the electronic control unit to be restored), the control unit 39 transfers the backed up data to the electronic control unit to be restored and instructs the corresponding electronic control unit to install the data. After that, the process proceeds to step S103. The update-target electronic control unit reinstalls (restores) the previous software by writing the data received from the software update device 11 to the data storage area. After that, the process proceeds to step S104.

In step S103, the control unit 39 does not activate the updated software and instructs the electronic control unit to be restored to set the data storage area storing the previous software as the data storage area to be read. After that, the process proceeds to step S104.

In step S104, the control unit 39 determines whether all the electronic control units to be restored have been restored. When the determination in step S104 is YES, the process proceeds to step S105; otherwise, the process proceeds to step S101.

In step S105, the control unit 39 instructs the electronic control unit to be restored to activate the previous version of the software. After that, the process ends. The update-target electronic control unit is restarted when a specific operation such as turning off of power supply or ignition is performed, and executes the previous software. The restoration process shown in FIG. 9 makes it possible to maintain the previous software as the software to be executed by the electronic control unit.

The software update device 11 according to the present embodiment confirms with the server 1 whether the downloaded update data is valid after the update data is downloaded and before the downloaded update data is installed, and when the downloaded update data is invalid at the time of the installation, the software update device 11 does not install the update data. As a case of updating the software of the electronic control unit, a case in which the update data is installed after a lapse of time from completion of downloading the update data is assumed. In this case, the campaign related to the downloaded update data may be canceled. However, the software update device 11 according to the present embodiment confirms the validity of the update data before the update data is installed, which makes it possible to restrain installation of the software that is determined to be invalid due to cancellation of the campaign. This further makes it possible to maintain the software of the electronic control unit that was to be updated at the time of downloading in a valid and up-to-date state.

Further, the software update device 11 according to the present embodiment confirms with the server 1 whether the downloaded update data is valid again after the installation process and before the activation process. When the downloaded update data is valid at the time of activation, the updated software is activated. As described above, the configuration of the software update device 11 in which the validity of the update data is confirmed multiple times during the software update process makes it possible to more reliably restrain the electronic control unit from being applied the update data that is invalid due to cancellation of the campaign, etc. When the downloaded update data is determined to be invalid after the installation process and before the activation process, the software update device 11 reinstalls the previous software or does not activate the updated software such that a state where the electronic control unit can execute the software (previous software) that is valid and up-to-date at the time before installation of the update data can be restored, which restrains the electronic control unit from being applied the update data that is invalid.

The function of the server 1 exemplified as the embodiment above can be realized as an update management method executed by a computer including a processor (CPU), a memory, and a storage device, an update management program executed by the computer, or a computer readable non-transitory storage medium that stores the update management program. Similarly, the function of the software update device 11 exemplified as the embodiment can be realized as an update control method executed by an in-vehicle computer including a processor (CPU), a memory, and a storage device, an update control program executed by the in-vehicle computer, or a computer readable non-transitory storage medium that stores the update control program.

In the above embodiment, an example in which the software update device 11 provided in the in-vehicle network controls the program update of all the electronic control units 13a to 13d as the master device. However, any one of the electronic control units 13a to 13d may have the update control function shown in FIGS. 7 to 9 and control program updates of the other electronic control units, instead of providing the software update device 11. Further, instead of providing the software update device 11, the update control function shown in FIGS. 7 to 9 can be provided in an external device that can be connected to the in-vehicle network 2 by wire so as to perform the program update process of the electronic control units 13a to 13d using the external device.

The disclosed technology can be used in a network system for updating program of an electronic control unit.

What is claimed is:

1. A software update device configured to control software update of an electronic control unit mounted on a vehicle, the software update device comprising one or more processors mounted on the vehicle, the one or more processors being configured to:
   download update data of software of the electronic control unit from a server;
   verify authenticity of the update data;
   transmit a first confirmation request to the server after downloading the update data and before starting installation of the update data, the first confirmation request being a request to confirm whether a campaign related to the update data is canceled;
   receive a confirmation result from the server, the confirmation result being sent by the server in response to the first confirmation request;
   determine, before starting the installation of the update data, whether the campaign related to the update data is canceled based on the confirmation result received by the one or more processors, wherein
   the installation of the update data is not started in a case where the authenticity of the update data has been verified and the campaign related to the update data is determined to be canceled; and
   the installation of the update data is started in a case where the authenticity of the update data has been verified and the campaign related to the update data is determined not to be canceled.

2. The software update device according to claim 1, wherein the one or more processors are configured to:
   transmit a second confirmation request for a second confirmation result indicating whether the campaign related to the update data is canceled to the server after the update data is installed and before the update data that is installed data is activated;
   receive the second confirmation result from the server, the second confirmation result being sent by the server in response to the second confirmation request; and
   set previous software before the update data is installed as the software to be executed by the electronic control unit in which the update data is installed when the campaign related to the update data is determined to be canceled based on the second confirmation result received by the one or more processors.

3. The software update device according to claim 2, wherein the one or more processors are configured to not activate the software that is updated when the campaign related to the update data is determined to be canceled based on the second confirmation result received by the one or more processors and a non-volatile memory mounted in the electronic control unit that is an update target includes two storage areas.

4. The software update device according to claim 2, further comprising a storage device configured to store data of the previous software executed, before the update data is installed, by the electronic control unit that is an update target, wherein the one or more processors are further configured to reinstall the previous software using the data of the previous software stored in the storage device when the campaign related to the update data is determined to be canceled based on the second confirmation result received by the one or more processors and a non-volatile memory mounted in the electronic control unit that is the update target includes one storage area.

5. An update control method executed by a computer that is mounted on a vehicle and that includes a processor, a memory, and a storage device for controlling software update of an electronic control unit mounted on the vehicle, the update control method comprising:
   downloading update data of software of the electronic control unit from a server;
   verifying authenticity of the update data;
   transmitting a first confirmation request to the server after downloading the update data and before starting installation of the update data, the first confirmation request being a request to confirm whether a campaign related to the update data is canceled;
   receiving a confirmation result from the server, the confirmation result being sent by the server in response to the first confirmation request;
   determining, before starting the installation of the update data, whether the campaign related to the update data is canceled based on the confirmation result received by the computer, wherein
   the installation of the update data is not started in a case where the authenticity of the update data has been verified and the campaign related to the update data is determined to be canceled; and
   the installation of the update data is started in a case where the authenticity of the update data has been verified and the campaign related to the update data is determined not to be canceled.

6. A non-transitory storage medium storing an update control program that is executable by a computer and that causes the computer to perform the update control method according to claim 5 so as to control software update of an electronic control unit mounted on a vehicle, the computer being mounted on the vehicle and including a processor, a memory, and the non-transitory storage medium.

* * * * *